Nov. 29, 1960     F. HEFLING     2,962,298
TRAILER LANDING GEAR

Filed June 18, 1958     2 Sheets-Sheet 1

INVENTOR.
Frank Hefling
BY

Nov. 29, 1960   F. HEFLING   2,962,298
TRAILER LANDING GEAR
Filed June 18, 1958   2 Sheets-Sheet 2
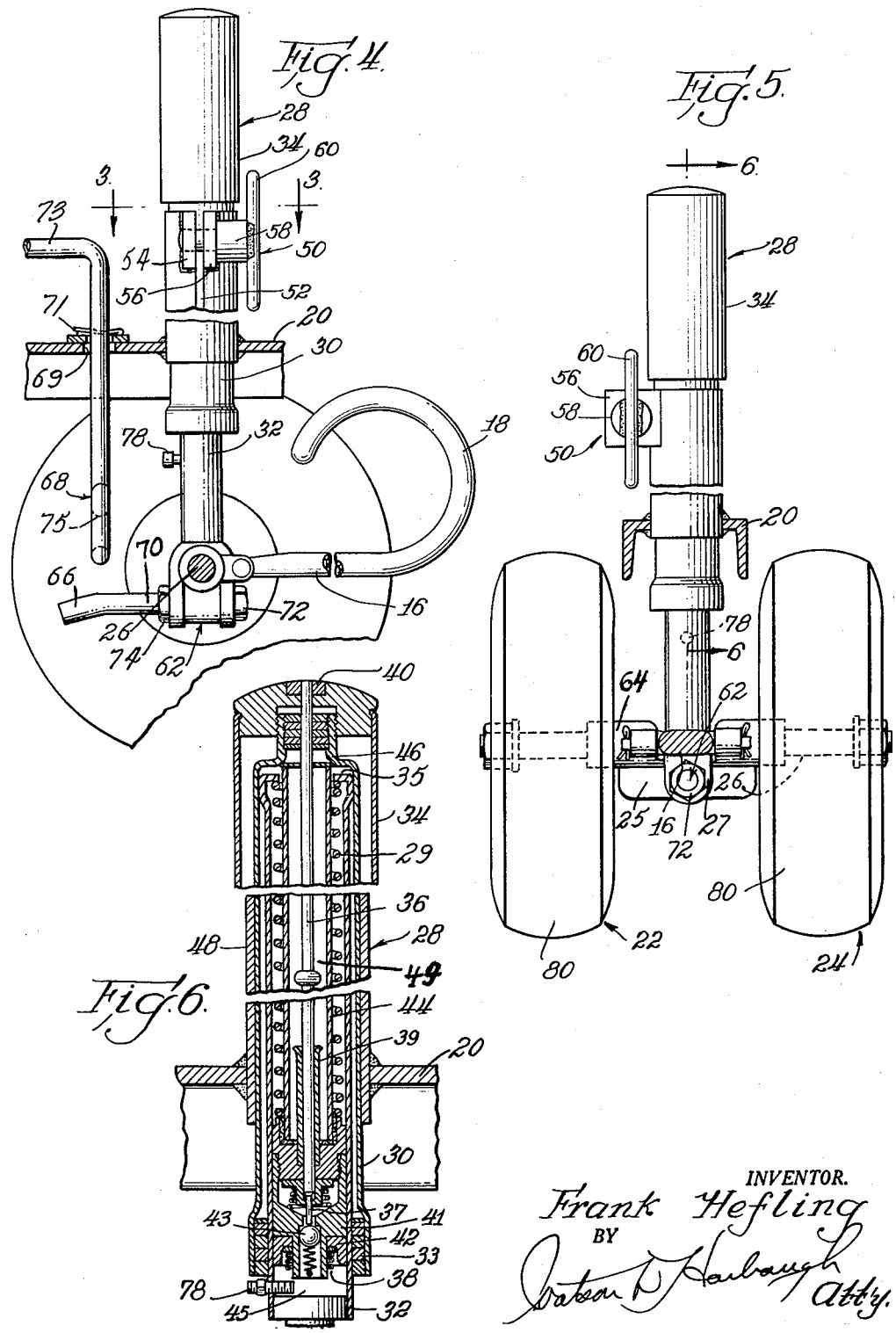
INVENTOR.
Frank Hefling
BY
Watson D. Harbaugh
Atty.

United States Patent Office 2,962,298
Patented Nov. 29, 1960

2,962,298

TRAILER LANDING GEAR

Frank Hefling, 8053 S. Manistee, Chicago, Ill.

Filed June 18, 1958, Ser. No. 742,959

10 Claims. (Cl. 280—150.5)

This invention relates to a retractible carriage for the front end of a semi-trailer, and more particularly to an air-cushioned two-wheeled carriage which may be raised or lowered by means of a single hydraulic jack and which has coupling means associated therewith for use when the standard trailer hitch is damaged or broken. This application is a continuation-in-part application of my application Serial No. 505,942, filed May 4, 1955, now abandoned.

Heretofore, retractible carriages adapted to adjustably support the front end of a semi-trailer have been deficient in that either the carriage itself could not be used in ordinary hauling because only one wheel was employed and the semi-trailer thereby rendered unsteady, or else the means for raising and lowering the carriage have been overly complex and have required considerable effort in operation, as, for example, double or triple retraction means and retraction means employing gear elements.

A further disadvantage of such carriages has been that means for cushioning the connection between the trailer and the retraction element have been lacking, so that the use of the carriages has generally been limited to supporting the semi-trailer in stationary position. Correspondingly, steering means for such carriages have been inadequate because they have not provided a coupling between the semi-trailer and tractor, this last deficiency being a consequence of the fact that use of the carriages in transportation had not been contemplated.

It is accordingly an object of the present invention to provide a retractible two-wheeled carriage which may be used in transportation, and which will permit the semi-trailer to be turned during ordinary travel without danger of tipping.

Another object is to utilize a single hydraulic jack for retracting and extending the carriage which is simple and exceptionally sturdy in construction and which may be operated with a minimum of effort.

Another object is to provide a jack of the type indicated which also provides air cushioning for the carriage so that it may be used in transportation.

Yet another object is to provide steering means for the carriage which may be fastened thereto in a very simple manner, the steering means being also adapted to provide a coupling between the semi-trailer and tractor when the standard coupling elements are damaged or broken.

Other objects and advantages of the invention will become apparent as the description proceeds with reference to the drawings, in which:

Fig. 4 is an enlarged side elevational and somewhat diagrammatic view of the carriage of the invention;

Fig. 5 is a front elevational view of the carriage corresponding to the view of Fig. 4; and Fig. 6 is a cut-away elevational view of the hydraulic jack.

Figure 1:
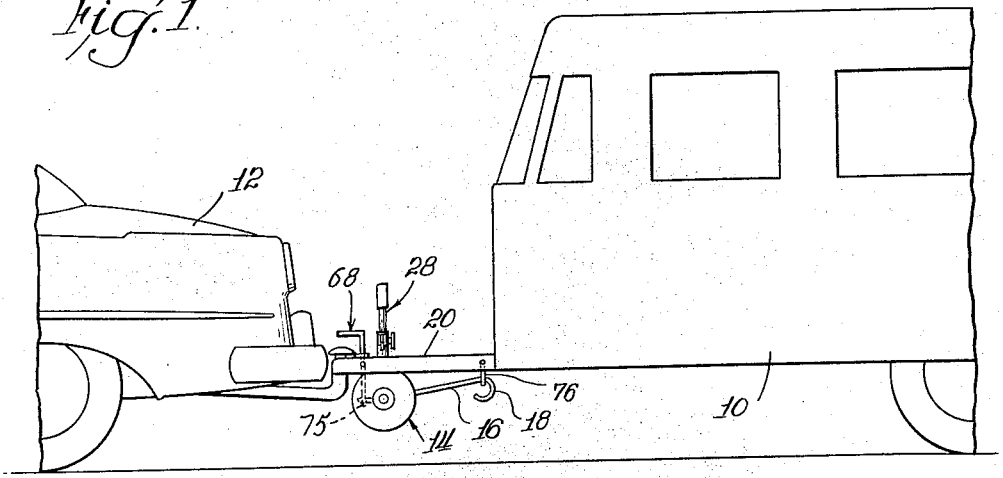
Fig. 1 is a side elevational view of a carriage according to the present invention, showing the semi-trailer and tractor coupled together by a standard means, the coupling means of the carriage retained on the semi-trailer in inoperative position.
Figure 2:
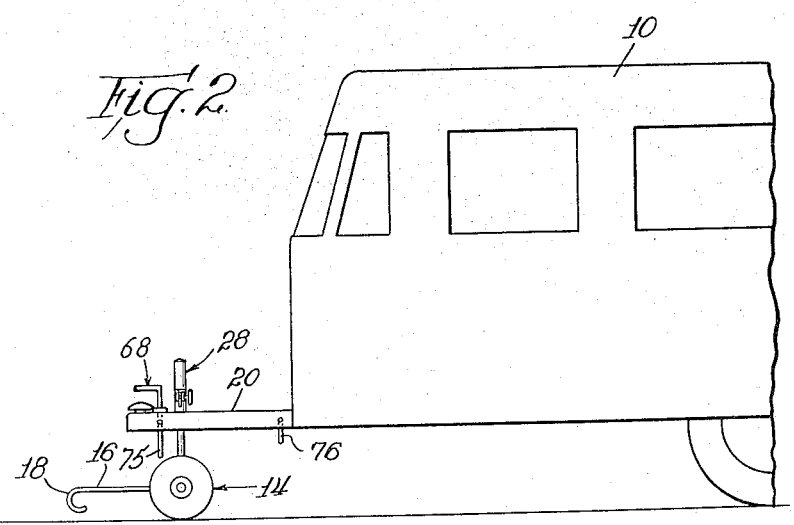
Fig. 2 is a side elevational view of the semi-trailer as supported by the carriage of the invention in uncoupled position.
Figure 3:
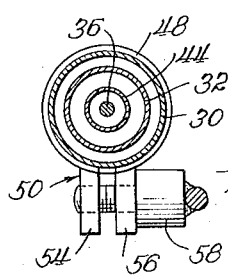
Fig. 3 is a horizontal sectional view of the hydraulic jack according to the invention, taken through the line 3—3 of Fig. 4.

Referring now to Fig. 1, a semi-trailer 10 is shown coupled to a car 12 by a standard hitch 13 with the carriage 14 in raised or retracted position and the tongue 16, for use in emergency coupling, shown retained by a hook 18 in uncoupled position on the draw bar 20.

The carriage 14 has two wheels 22 and 24 journalled on an axle 26, which preferably is offset downwardly at 25 at the center of the axle when the hydraulic jack 28 having a yoke 27 is secured thereto by a bearing bolt 72. The jack is adapted to selectively extend and retract the carriage 14. The jack 28 is preferably of an exceptionally heavy construction which will withstand the compression stresses exerted on it by the semi-trailer 10, and includes a tubular casing 30, a lift tube 32 slidably mounted therein in sealed relation therewith upon its outer surface at the packing 33. The lift tube below the packing extends downwardly from the casing 30 where at its lower end it is permanently plugged and secured to the axle 26 as will be further described. A cap forming a hand grip 34 for operating the hydraulic pump is secured to the pump rod 36 by nut 40 and covers the top of the casing 30. Inside of the lift tube is mounted an elongated tubular member 44 which at its upper end is brazed and disposed in weight bearing relationship against a necked down sleeve 46 formed integrally with the casing 30. At its lower end the tubular member 44 is supported on a piston-like assembly or head 41 that is disposed in slidable relationship with the inside wall of the lift tube 32 as sealed by a piston cup seal 42 carried thereby. The cup seal provides a recess 38 on the lower face of the head 41 to trap air as hereafter described as a part of the chamber 45 between the piston head 41 and lift tube 32. Thus the lift tube 32 telescopes in sealed and uninterrupted rotatable relationship between the casing 30 and the tubular member 44, and, being closed at its lower end, it is formed downwardly whenever hydraulic fluid is pumped into the chamber 45 below the piston 41. The upper end of the lift tube is flanged inwardly at 35, and between this flange and the head 41 is disposed a compression spring 29 which urges the lift tube 32 to its upward limit.

The elongated member 44 not only serves as a guide sleeve for the spring 29 but the space therein serves as a reservoir 49 for hydraulic fluid and the jack is provided with a pump rod 36 operated by the cap 34 as secured thereto by a nut 40. The pump rod cooperates with a cylinder sleeve arrangement 39 in the piston 41 to pump fluid into the chamber below the piston 41 past a check valve 43. As the pump rod is raised valve 43 is closed and fluid is drawn into the sleeve 39 through the clearance between the rod and sleeve. Then when the rod is forced down rapidly fluid ahead of the end of the rod is forced through the valve 43. When the pump rod 36 is thus reciprocated by means of the cap 34, the chamber 45 is filled with hydraulic fluid under pressure which as backed up at the top by piston 41 presses downwardly against the closed end of the lift tube 32 to urge their relative extension. Thereby if the lift tube 32 is supported on the ground the tube 44 and casing 30 are elevated or raised along with anything attached to them. Thereafter, whenever reverse movement is desired the pump rod is forced downwardly beyond a certain point where a needle 37 on the end thereof engages and opens the valve 43 to let the hydraulic fluid flow back to the reservoir 49 through the loose fit clearance between the pump rod 36 and cylinder sleeve 39.

Means for holding the casing 30 against axial movement relative to draw bar 20 could be a set screw or key way pin that preferably comprises the heavy bearing sleeve 48 adapted to fit snugly upon the casing 30. The sleeve is kerfed at 52 to form a C-clamp arrangement 50 along with a pair of heavy flanges 54 and 56 welded to the top of the sleeve as located on opposite sides of the kerf where they may be selectively drawn together or released by a bolt 58 threadedly received therethrough and having a handle 60, to effect the clamping action of the C-clamp 50 thus formed.

The bearing sleeve 48 is welded or otherwise suitably secured in the draw bar 20 perpendicularly thereto and by adjustment of the C-clamp 50 the jack may be located and secured axially in the bearing sleeve 48 in any desired position relative to the draw bar.

The lift tube 32 of the jack is preferably secured to the axle 26 by means of a swivel joint construction 62. The lower end of the lift tube 32 is bifurcated to form the yoke 27 which straddles the offset portion 25 of the axle and is secured thereto by a bearing bolt 70 extending through the offset. The bolt is shouldered at 74 to engage one of the yoke members and receives a nut 72 on one end engaging the other yoke member. On the other end of the bolt a crooked extension 66 is provided to be engaged and supported by the depending eye bolt 68. The eye bolt is loosely mounted for this purpose in a hole 69 in draw bar 20 where it is supported by the cotter pin and washer assembly 71 so that it can be tilted by the handle 73 to slip the eye 75 in the lower end of the eye bolt over the crooked extension 66 when the wheels are in raised position. Accordingly, the wheels 22 and 24 may teeter transversely upon the bolt 70 to accommodate irregularities in the road and the like as well as roll in any direction under the control of the tongue 16. Preferably the teeter axis provided by the bolt 70 is below the axis of the wheels to provide maximum raising distance for the wheels and to prevent a tilting or toppling of the front wheels in going around a curve.

The tongue 16 may also be hingedly secured to the sleeve 64 for selectively positioning it either in the bracket 76 in upwardly inclined relation to draw bar 20 to aid in supporting the jack in retracted position or in coupled relation with a car 12 by means of hook 18 extending forwardly of the bar. Thus, turning the tongue 16 laterally also serves to turn the wheels 22 and 24, and since these wheels furnish a stable support for the front end of the semi-trailer 10, the carriage may be used in moving the semi-trailer when the standard coupling hitch has become damaged.

It will be appreciated that the amount of stress exerted by the semi-trailer upon the jack 28 and the carriage will be large and therefore, in order to protect these parts and to cushion shocks on the semi-trailer, a special air cushioning is provided in the jack itself. Thus, the lift tube 32 has formed adjacent the lower end thereof a check valve 78 of a well known type so that air may be pumped into the recess 38 whereby to form an air pocket between the cup 42 and the hydraulic fluid in the said recess. Where air is pumped into recess 38 under the proper pressure, the air pocket thereby formed will act as a spring or cushion to overcome the effect of road bumps and the like.

Thus, the air cushion formed in the recess 38 at the top of the hydraulic fluid contained in the chamber 45 will cooperate with the two wheels 22 and 24, which are preferably provided with pneumatic tires 80, to afford a relatively easy riding action for the carriage so that the objective of combining an emergency coupling with a retractible carriage for use in transportation of the semi-trailer will be achieved without any danger of breakdown due to the weight to be supported by the carriage.

Although I have herein described and set forth the details of the invention with respect to certain specific features and principles, it is to be understood that modifications thereof are within the scope of the invention as set forth in the foregoing description and in the following claims.

I claim:

1. In combination with a semi-trailer having a draw bar thereon, a retractible carriage comprising a hydraulic jack secured in substantially perpendicular relation to said draw bar and having a pair of wheels secured to the lower end thereof and a coupling tongue secured to said carriage for movement from a rearward position beneath said draw bar to a position for coupling forwardly of said draw bar, said hydraulic jack including a casing tube and a lift tube telescoping in guided relationship therein, said lift tube being rotatable within said casing tube and extending downwardly therefrom, and hydraulic means within said lift tube having an elongated element adapted to bear against said casing tube, a piston supported by said elongated element and disposed in said lift tube for selective extension or elevation of said lift tube and wheels, said elongated element defining at its lower extremity in cooperation with the lower end of said lift tube a recess for receiving therein hydraulic fluid in weight supporting relationship, a valve being formed on said lift tube and venting into said recess whereby air may be pumped into said recess to form an air cushion over the hydraulic fluid contained therein.

2. In combination with a semi-trailer having a draw bar thereon, a retractible carriage comprising a hydraulic jack having relatively rotatable members disposed in a position perpendicular to said draw bar, a pair of wheels secured to the lower end of one of the members, a coupling tongue pivotally secured to said one member for vertical movement and for movement with said one member from a rearward position beneath said draw bar to a position extending forwardly and axially of said draw bar selectively to turn the wheels under the draw bar, and means for securing said jack to said draw bar comprising a bearing sleeve in said draw bar slidably receiving the other of said members therethrough, and means carried by said bearing sleeve for securing said other member whereby the jack may be held at any vertical position for resting or working conditions.

3. The combination called for in claim 2 in which said means for securing said other member comprises a C-clamp formed on said bearing sleeve.

4. In combination with a semi-trailer having a draw bar extending axially and forwardly thereof, a retractible carriage comprising a hydraulic jack secured to the draw bar substantially in perpendicular relation thereto and having members telescoping with respect to each other and arranged for relative rotation at any level of their telescoping movement, a pair of steering wheels secured to the lower end of one of the members, means for securing the other one of said members to said draw bar in weight supporting relationship, a coupling tongue secured to said one of said members for turning said steering wheels and means releasably interconnecting said coupling tongue and draw bar for holding said steering wheels in safety forward running position in planes parallel to the planes of said road wheels.

5. In combination with a semi-trailer having a draw bar extending axially and forwardly thereof, a retractible carriage comprising a hydraulic jack secured to the draw bar substantially in perpendicular relation thereto and having members telescoping with respect to each other and arranged for relative rotation through 360° of rotation, a wheel secured to the lower end of one of the members, means carried by said draw bar slidably receiving the other one of said members in vertically adjusted relationship with respect to said draw bar for securing said other member in weight supporting relationship, a coupling tongue secured to said one member for steering said wheel through said 360°, and means on said coupling tongue for coupling said tongue with a tractor which may be used with said semi-trailer.

6. In combination with a semi-trailer having a draw bar extending axially and forwardly thereof, a retractible carriage comprising a hydraulic jack secured to the draw bar substantially in perpendicular relation thereto and having members telescoping with respect to each other and arranged for relative rotation throughout 360° of rotation, a wheel secured to the lower end of one of the members, a coupling tongue, means for connecting said coupling tongue to said one member for steering said wheel throughout said 360° of rotation, means for securing the other one of said members to said draw bar in weight supporting relationship, means interconnecting said members for urging said one member upwardly with respect to said other member, and means on said draw bar for releasably supporting said tongue below it with said wheel in forwardly running position.

7. In combination with a semi-trailer having a draw bar thereon, a retractible carriage comprising a hydraulic jack secured to said draw bar in perpendicular relation thereto and having two vertically disposed members rotatable with respect to each other, a pair of wheels, axle means supporting said wheels for rotation about a common axis at the lower end of said hydraulic jack, means for securing said axle means to one of said members for pivotal movement on a horizontal axis disposed crosswise to said axle below said common axis, said wheels being retracted or extended by said members and rotatable with respect to said semi-trailer, a coupling tongue pivotally secured to said one member for vertical movement and for rotating said wheels bodily with said one member by movement horizontally between a position below said draw bar and a position forwardly thereof, and means carried by said draw bar for supporting said wheels in forward running position including an element at one end of the coupling tongue adapted for attachment to a tractor which may be used in moving the said semi-trailer.

8. In combination with a semi-trailer having a draw bar thereon, a retractible carriage comprising a hydraulic jack, means secured to said draw bar in perpendicular relation thereto for slidably receiving said jack in adjustably secured relationship, said jack including a housing engaged by said means and a vertically retractible supporting member rotatable about a vertical axis in said housing, a pair of wheels secured to said supporting member for selective raising and lowering in supporting relation to said semi-trailer, and a coupling tongue pivotally secured to said supporting member for relative vertical movement and for controlling rotation of said supporting member about said vertical axis, bracket means upon said draw bar for receiving and holding said tongue in resting position to hold the wheels in safety forward running position, and means for supporting said wheels in weight bearing relationship including a stud carried by said supporting member and a horizontally movable element carried by said draw bar engaging said stud when said wheels are in safety forward running position.

9. A retractible carriage for a semi-trailer having a forwardly extending draw bar including a hydraulic jack having two telescoping members rotatable with respect to each other, one of which is secured substantially perpendicularly to said draw bar, hydraulic pump means for extending and retracting the other of said members below said draw bar and defining a space between said members, a wheel secured to the lower end of said other member for supporting said semi-trailer in transportation when said other member is in extended position, a tongue pivotally secured to said other member for rotating said wheel to steer the semi-trailer, means for injecting air under pressure into the space between said members, and means upon said draw bar for receiving and holding said tongue in position to hold the wheel in safe forward running position when said other member is retracted to raise said wheel.

10. A retractible carriage for a semi-trailer having a draw bar and comprising a hydraulic jack having two telescoping members rotatable with respect to each other with one of them secured in substantially perpendicular relation to the draw bar, means for cushioning the other member on the other including a body of fluid under pressure between them, a pair of wheels having an axle for maintaining the wheels in predetermined spaced-apart relation, means for pivotally securing said axle to said other member about a horizontal axis for tilting and for supporting the wheels in weight bearing relationship thereby, a coupling member pivotally secured to said axle for steering said wheels through an arc of 360° and means resiliently urging relative movement of said members in a direction collapsing said telescoping relationship.

References Cited in the file of this patent

UNITED STATES PATENTS

| | | |
|---|---|---|
| 1,161,706 | Lohmiller | Nov. 23, 1915 |
| 2,205,436 | Richards | June 25, 1940 |
| 2,571,067 | Seckendorf | Oct. 9, 1951 |
| 2,572,410 | Van Doorne | Oct. 23, 1951 |
| 2,692,143 | Rando | Oct. 19, 1954 |
| 2,724,590 | Irwin | Nov. 22, 1955 |
| 2,786,690 | Tharp | Mar. 26, 1957 |

FOREIGN PATENTS

| | | |
|---|---|---|
| 811,649 | Germany | Aug. 23, 1951 |
| 135,534 | Sweden | Jan. 31, 1952 |
| 211,222 | Switzerland | Nov. 18, 1940 |